United States Patent
Czerepinski et al.

(10) Patent No.: US 12,452,639 B2
(45) Date of Patent: Oct. 21, 2025

(54) MM WAVE WIRELESS COMMUNICATION UNIT AND SYSTEM

(71) Applicant: Blu Wireless Technology Ltd, Bristol (GB)

(72) Inventors: Przemyslaw Czerepinski, Bristol (GB); Jamie Lee, Bristol (GB)

(73) Assignee: Blu Wireless Technology Ltd., Bristol (GB)

( * ) Notice: Subject to any disclaimer, the term of this patent is extended or adjusted under 35 U.S.C. 154(b) by 340 days.

(21) Appl. No.: 18/340,631

(22) Filed: Jun. 23, 2023

(65) Prior Publication Data
US 2024/0430659 A1    Dec. 26, 2024

(51) Int. Cl.
*H04W 8/00*    (2009.01)
*H04W 48/20*   (2009.01)

(52) U.S. Cl.
CPC ........... *H04W 8/005* (2013.01); *H04W 48/20* (2013.01)

(58) Field of Classification Search
CPC ..... H04W 8/005; H04W 48/20; H04W 48/08; H04W 48/12; H04W 40/244; H04W 16/28; H04W 48/16; H04B 7/0617; H04B 7/0695; H04B 7/088
See application file for complete search history.

(56) References Cited

U.S. PATENT DOCUMENTS

| 11,246,082 B1* | 2/2022 | McConnell ... H04W 36/008357 |
| 2010/0074190 A1* | 3/2010 | Cordeiro ............... H04W 48/16 |
| | | 370/329 |
| 2018/0192356 A1* | 7/2018 | Trainin ................ H04B 17/336 |

FOREIGN PATENT DOCUMENTS

| EP | 3729899 B1 | 9/2021 |
| EP | 3982555 A  | 4/2022 |

* cited by examiner

*Primary Examiner* — Andrew W Chriss
(74) *Attorney, Agent, or Firm* — Optimus Patents US, LLC

(57) ABSTRACT

A wireless communication system comprises wireless access points arranged to communicate with wireless communication units using mm wave radio communication links formed in communication sub-channels that are given by a bandwidth, a channel frequency, a large frequency offset, and a small frequency offset. The access points transmit beacons and the communication units seek to discover access points by scanning. A scanner of the communication unit scans communication sub-channels for a beacon transmitted by a wireless access point and terminates the scan if a beacon is detected. The scan order is arranged to keep the small frequency offset fixed while varying the large frequency offset. A controller controls a communication circuit to set up a mm wave radio communication link to the access point of a detected beacon. This may allow faster scanning with typically an improved and faster detection of a beacon from a suitable access point.

17 Claims, 5 Drawing Sheets

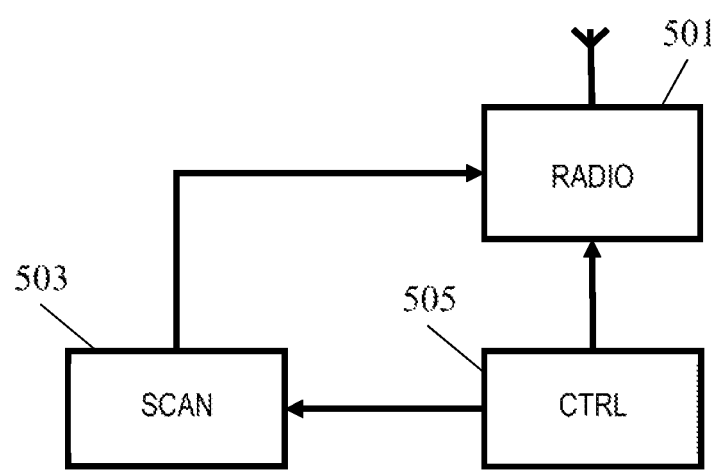
101    FIG. 5

MM WAVE WIRELESS COMMUNICATION UNIT AND SYSTEM

FIELD OF THE INVENTION

The invention relates to communication in a mm wave radio communication system network, and in particular, but not exclusively to using mm wave radio communication to support mobility of communication units and/or access points in the system.

BACKGROUND OF THE INVENTION

Wireless communication has become ubiquitous and forms the basis of many applications and services provided to the consumer of today. A particularly widespread set of wireless communication systems, colloquially known as Wi-Fi, has been developed by the Wi-Fi Alliance and is standardized in the Institute of Electrical and Electronics Engineers (IEEE) 802.11 standards. Wi-Fi wireless communication systems are typically used to implement Wireless Local Area Networks (WLANs) in many different environments, such as in homes, workplaces, or public areas.

Wi-Fi systems provide many functions, features and services suitable for efficient implementation of WLANs and data communication. The IEEE 802.11 standards have been, and are being, developed to provide an increasing number of functions, services and benefits. The initial versions of the IEEE 802.11 standards were based on radio communication in the 2.4 GHz band, but this has been enhanced to also include the 5 GHz band. Variants include IEEE 802.11ad and IEEE 802.11ay which further expand the standard to support communications in the 60 GHz band.

A general problem is that in order to support high capacity communication, a significant amount of air interface resource (spectrum) is required, and this tends to restrict the capacity that can be provided by many existing systems in the most frequently used frequency ranges. This in particular applies to both cellular and Wi-Fi based wireless communication systems. It is therefore desirable to exploit less used frequency bands and there is substantial interest in providing high capacity support of communication units using millimeter-wave (mm) wavelength based communication, such as specifically the 60 GHz frequency band.

In general, the efficient usage of the air interface in mm wave communication is a difficult challenge to address. This challenge is further exacerbated by the desire to provide this function in communication systems that are compatible with many existing network techniques and principles, such as Internet Protocol based routing, existing network-based mobility functions etc. However, most approaches for supporting communication for in particular fast moving vehicles tend to be suboptimal.

In particular, providing sufficient air interface capacity to support high rate communication with communication units that may be mobile is a difficult challenge. An advantage of using higher frequencies and mm wave radio communications is that it tends to allow large bandwidths to be allocated to communications. Further, the frequency bands tend to be less used, and interference tends to be spatially limited to shorter ranges. Therefore, mm wave radio communication tends to offer the possibility of reliable high communication capacity which is highly advantageous in many situations.

However, implementing a system that is able to adapt resource allocations to different communication entities in an efficient, adaptive, and dynamic way is significant challenge. In many systems, communication resource is divided into different communication channels which may be allocated to individual communication links. For example, in systems with an interconnected set of wireless access points, each access point may communicate with remote wireless units in allocated communication channels.

Establishing communication links in different communication channels allows for a more efficient usage of the available air interface resource. In particular, interference between different communication links can be reduced or even removed for fully orthogonal communication channels. However, in practice the number of communication channels may be limited and accordingly some interference between different communications (e.g. for different access points) may occur. Such interference may reduce the communication performance and may in particular affect the accurate detection of preambles using specific patterns (that may e.g. be reused between different access points). In order to reduce the probability of access points using the same communication channel, it is in many systems desired that as many different communication channels as possible are available to the access points. However, increasing the number of communication channels may reduce the capacity of each channel and may further increase the operational complexity (e.g. in allocating resource) and delay a number of operations.

As wireless devices move, they may change associations to new access points and communication links may dynamically be dropped and formed with different access points. In many communication systems, this may be based on the wireless devices proceeding to detect if new access points are available when a new communication link is desired (either due to a new communication operation being initialized or due to an ongoing link dropping, for example because the wireless device moves further away from the supporting access point). For example, the access points may transmit beacons that can be detected by remote wireless devices and these devices may accordingly be arranged to detect the presence of the access point by detecting the beacons. A device seeking to establish a new link with an access point may accordingly scan for beacons. However, in many systems, a relatively high number of different communication channels are possible, and it may result in a slow scan process with potentially a significant delay before a given beacon can be detected. This may further result in a slow link establishment which may result in a substantial delay or lag to the communication provided, e.g. when a switch to a new access point is required.

Hence, an improved mm wave wireless radio communication system and operation would be advantageous. In particular, an approach that allows improved operation, improved reliability, increased flexibility, facilitated implementation, facilitated and/or improved operation, improved resource utilization and in particular air interface resource utilization, facilitated and/or improved resource management, improved and/or facilitated adaptation to changed configuration of the mm wave radio communication system, improved support for mobility, improved, facilitated, and/or faster communication link setup or access point switch, improved, facilitated and/or faster detection of access points, and/or improved performance would be advantageous.

SUMMARY OF THE INVENTION

Accordingly, the Invention seeks to preferably mitigate, alleviate or eliminate one or more of the above-mentioned disadvantages singly or in any combination.

According to an aspect of the invention there is provided a wireless communication unit for a mm wave communication system comprising wireless access points arranged to communicate with wireless communication units using mm wave radio communication links formed in communication sub-channels of a communication channel selected from a plurality of communication channels, each communication channel having a communication channel bandwidth and a communication channel frequency and each communication sub-channel having a: communication sub-channel communication bandwidth selected from a set of bandwidths not exceeding the communication channel bandwidth; and a communication sub-channel frequency being the combination of: a communication channel frequency of a communication channel, a first frequency offset selected from a first set of frequency offsets, the first set of frequency offsets having a magnitude not exceeding half of the communication channel bandwidth and a minimum difference between frequency offsets of any first set of frequency offsets that comprise a plurality of frequency offsets being no less than one fourth of the communication sub-channel bandwidth; and a second frequency offset selected from a second set of frequency offsets, a maximum magnitude of the second set of offset frequencies not exceeding a tenth of the communication sub-channel bandwidth; the wireless communication unit comprising: a communication circuit arranged to communicate with wireless access points over mm wave radio communication links formed in communication sub-channels; a scanner arranged to scan communication sub-channel for a beacon transmitted by a wireless access point; and a controller arranged to initiate a mm wave radio communication link with a first wireless access point in a first communication sub-channel in response to the scan circuit detecting a beacon being received from the first wireless access point in the first communication sub-channel; wherein the scan circuit is arranged to scan the sub-channels in a scan order and to terminate the scan in response to the detection of the beacon being received; and the scan order includes a sequence of a plurality of sub-channels having a same second frequency offset and at least one of different first frequency offset and a different communication channel frequency.

The invention may provide improved and/or facilitated operation and/or improved performance for a mm wave radio communication network/communication system. It may provide improved association and link setup to access points, including in particular in many scenarios a faster initialization of new links. The approach may in particular allow an improved and typically faster detection of beacons from suitable access points. In many embodiments, it may provide for an improved link being setup. In particular, a previous link may drop due to the link quality (e.g. due to attenuation or interference) and by the scan first seeking to detect a beacon in communication sub-channels with larger frequency offsets, rather than e.g. just scanning the subset chip sequence in frequency order, it is more likely that an access point experiencing different link properties can be detected (e.g. with less attenuation and/or less interference).

The approach may be particularly suitable for mm wave radio communication networks as it has been found to provide highly advantageous results with mm wave radio communication links, characterized by having relatively short ranges and typically requiring line of sight communication links.

The approach may provide advantageous implementation in many embodiments, and may typically allow implementation with reduced cost and/or complexity.

The communication channel frequency may be indicative of a (nominal/default) center or end interval frequency of the corresponding communication channel. Similarly, the communication sub-channel frequency may be indicative of a (nominal/default) center or end interval frequency of the corresponding communication sub-channel.

The communication channel bandwidth may be a multiple of all bandwidths of the set of bandwidths. The multiple may e.g. be 1, 2, 4 or 8. The communication channel may also be a communication sub-channel, i.e. the set of communication sub-channels may include the communication channel.

In many embodiments, the communication unit may be arranged to establish only a single mm wave radio communication link at a time. In many embodiments, the communication unit may comprise only a single radio transceiver function for mm wave radio communication.

A magnitude of the first frequency offsets may in many embodiments correspond to a multiple of half of the sub-channel bandwidth. A magnitude of the first frequency offsets may be less than half the communication channel bandwidth. The minimum difference between frequency offsets may specifically be the minimum absolute difference between the frequency offsets.

In some embodiments, some or all access points may be interconnected access points.

The following various optional features of the invention may each individually or together provide improved operation, performance, and/or implementation in many embodiments, including for many features an improved beacon detection and improved mm wave radio communication link initialisation.

In accordance with an optional feature of the invention, the scan order includes a set of nested loops comprising a first loop of varying the second frequency offset over the second set of frequency offsets and a second loop of varying the first frequency offset over the first set of frequency offsets, the second loop being an inner loop of the first loop.

In accordance with an optional feature of the invention, the set of nested loops comprises a third loop varying the sub-channel bandwidth over the set of sub-channel bandwidths, the first loop being an inner loop of the third loop.

In accordance with an optional feature of the invention, the set of nested loops comprises a further loop varying the communication channel frequency over communication channel frequencies of the plurality of communication channels; the further loop being an inner loop of the first loop.

In accordance with an optional feature of the invention, the set of nested loops comprises a further loop varying the communication channel frequency over communication channel frequencies of the plurality of communication channels; the further loop being an outer loop of the second loop.

In accordance with an optional feature of the invention, the set of nested loops comprises a further loop varying the communication channel frequency over communication channel frequencies of the plurality of communication channels; the further loop being an inner loop of the second loop.

In accordance with an optional feature of the invention, the scan circuit is arranged to detect that the beacon is received in response to a detection criterion comprising a requirement that a beacon signal is received that meets a signal quality criterion.

In accordance with an optional feature of the invention, the controller is arranged to terminate the scan in response to a detection that a signal is received from a wireless access point with which the wireless communication unit has previously established a mm wave radio communication link.

In accordance with an optional feature of the invention, the scan order is arranged to include communication subchannels having a first frequency offset with a magnitude not exceeding one hundredth of the communication sub-channel bandwidth before communication channels having a first frequency offset exceeding one hundredth, or in some cases one tenth, of the communication sub-channel bandwidth.

In accordance with an optional feature of the invention, the scan order is arranged to include communication subchannels having a second frequency offset with a magnitude not exceeding one hundredth of the communication sub-channel bandwidth before communication channels having a second frequency offset exceeding one hundredth, or in some cases one tenth, of the communication sub-channel bandwidth.

In accordance with an optional feature of the invention, the scan order is arranged to include communication subchannels having a larger bandwidth before communication subchannels having a smaller bandwidth.

In accordance with an optional feature of the invention, the first set of frequency offsets include a frequency offset having a magnitude not exceeding one hundredth of the communication sub-channel bandwidth.

In accordance with an optional feature of the invention, the second set of frequency offsets include a frequency offset having a magnitude not exceeding one hundredth of the communication sub-channel bandwidth.

In accordance with an optional feature of the invention, the first set of frequency offsets for at least one communication subchannel include only one frequency offset.

In accordance with an optional feature of the invention, a maximum frequency offset of the second set of frequency offsets does not exceed a fifth of a data symbol rate.

According to another aspect of the invention, there is provided a mm wave communication system comprising wireless access points arranged to communicate with wireless communication units using mm wave radio communication links formed in communication sub-channels of a communication channel selected from a plurality of communication channels, each communication channel having a communication channel bandwidth and a communication channel frequency and each communication sub-channel having a: communication sub-channel communication bandwidth selected from a set of bandwidths not exceeding the communication channel bandwidth; and a communication sub-channel frequency being the combination of: a communication channel frequency of a communication channel, a first frequency offset selected from a first set of frequency offsets, the first set of frequency offsets having a magnitude not exceeding half of the communication channel bandwidth and a minimum difference between frequency offsets of any first set of frequency offsets that comprise a plurality of frequency offsets being no less than one fourth of the communication sub-channel bandwidth; and a second frequency offset selected from a second set of frequency offsets, a maximum magnitude of the second set of offset frequencies not exceeding a tenth of the communication sub-channel bandwidth; and a wireless communication unit comprising: a communication unit arranged to communicate with wireless access points over mm wave radio communication links formed in communication sub-channels; a scan circuit arranged to scan communication sub-channel for a beacon transmitted by a wireless access point; and a controller arranged to initiate a mm wave radio communication link with a first wireless access point in a first communication sub-channel in response to the scan circuit detecting a beacon being received from the first wireless access point in the first communication sub-channel;
wherein the scan circuit is arranged to scan the subchannels in a scan order and to terminate the scan in response to the detection of the beacon being received; and the scan order includes a sequence of a plurality of subchannels having a same second frequency offset and at least one of different first frequency offset and a different communication channel frequency.

According to another aspect of the invention, there is provided a method of operation for a wireless communication unit for a mm wave communication system comprising wireless access points arranged to communicate with wireless communication units using mm wave radio communication links formed in communication sub-channels of a communication channel selected from a plurality of communication channels, each communication channel having a communication channel bandwidth and a communication channel frequency and each communication sub-channel having a: communication sub-channel communication bandwidth selected from a set of bandwidths not exceeding the communication channel bandwidth; and a communication sub-channel frequency being the combination of: a communication channel frequency of a communication channel, a first frequency offset selected from a first set of frequency offsets, the first set of frequency offsets having a magnitude not exceeding half of the communication channel bandwidth and a minimum difference between frequency offsets of any first set of frequency offsets that comprise a plurality of frequency offsets being no less than one fourth of the communication sub-channel bandwidth; and a second frequency offset selected from a second set of frequency offsets, a maximum magnitude of the second set of offset frequencies not exceeding a tenth of the communication sub-channel bandwidth; the wireless communication unit comprising: a communication unit arranged to communicate with wireless access points over mm wave radio communication links formed in communication sub-channels; and the method comprising: scanning communication sub-channels for a beacon transmitted by a wireless access point, the scanning of the communication sub-channels being in a scan order; terminating the scan in response to a detection of a beacon being received from a first wireless access point in a first communication sub-channel; and initiating a mm wave radio communication link with the first wireless access point in the first communication sub-channel in response to the scanning detecting the beacon received from the first wireless access point in the first communication sub-channel; wherein the scan order includes a sequence of a plurality of subchannels having a same second frequency offset and at least one of different first frequency offset and a different communication channel frequency.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which

FIG. 5 illustrates an example of elements of a communication unit in accordance with some embodiments of the invention.

DETAILED DESCRIPTION OF SOME
EMBODIMENTS OF THE INVENTION

Figure 1:
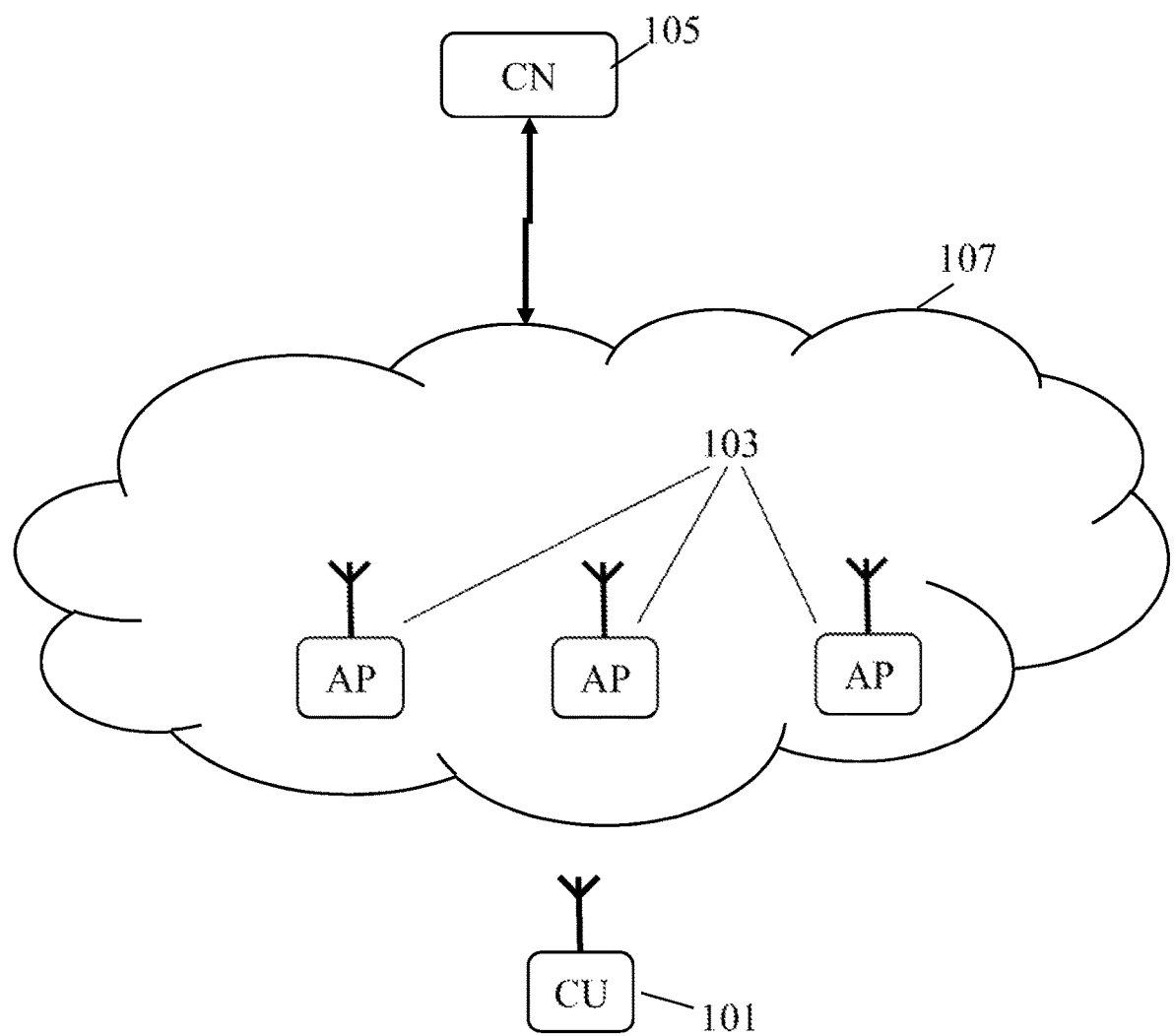
FIG. 1 illustrates an example of elements of a mm wave radio communication system in accordance with some embodiments of the invention.

FIG. 1 illustrates an example of elements of a communication system which supports communication with communication units 101 that are supported by a set of interconnected access points 103. The communication units 101 and/or the access points may in many scenarios be mobile.

In the example of FIG. 1, a communication/data session is established between a correspondent node 105 and a communication unit 101 which may be a mobile device. The correspondent node 105 may be any communication node/service, and indeed may itself be a mobile communication unit, or a node located in a vehicle.

The communication/data session is supported by a network 107 which may specifically be a complex network comprising routers, switches, management nodes, mobility controllers, modems etc. as will be known to the skilled person. In the example, the network 107 is a Wide Area Network, WAN, based on the Internet Protocol (IP).

The correspondent node 105 is coupled to the network 107 through a communication connection which supports the data session with the end node 101. The communication connection is in the example an IP connection and may be established using any suitable means, such as e.g. by a direct connection of a device comprising the corresponding node 105 to a node of the network or e.g. it may be a connection which is provided by a network coupled to both the network 107 and the corresponding node 105. The network may in particular be the Internet, and the coupling of the correspondent node 105 to the network 107 may be via an Internet connection. It will also be appreciated that the network 107 itself may be considered fully or partially part of the Internet and/or that the Internet may form part of the network 107.

It will be appreciated that although FIG. 1 (and the following) figures focus on description of communication for one end node, the system will typically support simultaneous communication for a large number of end nodes.

The coupling of the network 107 to the communications units 101 (of which one is illustrated in FIG. 1) is supported by mm wave radio communication links. For this purpose, the network 107 comprises a plurality of wireless access points (APs) 103 which in the specific example may be a relatively large number of stationary access points e.g. positioned at different positions in a geographical area.

In many embodiments, the APs may be stationary or fixed at given positions. However, in other embodiments, one, some or all of the APs may be mobile APs that may dynamically change position. In many embodiments, the communication units 101 may be mobile communication units but in many practical systems one, some, or all communication units may be stationary with fixed positions.

In the specific embodiment, the wireless radio links between the communication units 101 and the access points 103 are formed using relatively high radio frequencies, and specifically mm wave radio communication is used. For example, the wireless links may be formed by radio communications using the 60 GHz frequency band. Mm wave communications may specifically be communication in the 20 GHz to 300 GHz frequency range.

The communication units 101 are in the example individual nodes in the network configuration and have individual MAC addresses. Data packets can be addressed to the individual modems by other network entities, such as routers or switches, using the individual MAC addresses. A communication link is established from an access point 103 to a communication unit 101 using the MAC addresses of the AP 109 and the communication units 101.

In a specific embodiment of using the IEEE 802.11ad wireless technology, the AP and the communication units may form a BSS (basic service set). A scheduler may accordingly allocate data packets to an individual link by associating them with the appropriate MAC address. In particular, each AP may comprise a MAC layer scheduler which performs scheduling of date over the air interface of the AP based on MAC addresses. In many systems, the scheduling is based on a TDMA scheduling allocating time intervals/slots for individual air interface links (in some embodiments allocation may be in fixed duration time slots but in other systems allocation may be in variable duration time slots or intervals).

As a consequence, the radio conditions will tend to change quickly for the communication units 101, and specifically the optimum access points 103 to which to connect tend to change quickly. In order to support such scenarios, the system supports switching between different access points 103 such that a connection from a communication unit 101 to the network 107 (and the correspondent node 105) can be sequentially supported by different access points 103 as the communication unit 101 moves, or indeed if the access points move.

It is desirable for such handovers to be as fast as possible in order to minimize the interruption to the communication. In particular, in many communication systems each communication unit 101 may be arranged to only support one communication link at a time. In particular, the communication unit 101 may comprise only a single radio transceiver function such that only one radio function can be performed at a time.

In the system, each of the access points are arranged to transmit a beacon signal allowing it to be detected by communication units. The beacon transmission may include various data that allows communication units to adapt communication parameters such that it may allow, improve, or facilitate accessing and communicating with the access point communication unit.

In the system, communication units are arranged to access and communicate with access points but typically do not communicate directly with each other. Rather, communication between different communication units 101 is achieved via one or more access points. The access points are interconnected via the network such that communication units 101 served by different access points 103 can communicate with each other. In some embodiments, the communication system may allow direct communication between communication units 101 that are associated with (served by) the same access point. This communication may use a communication channel allocated to the access point and is performed under the control of the access point.

Figure 2:
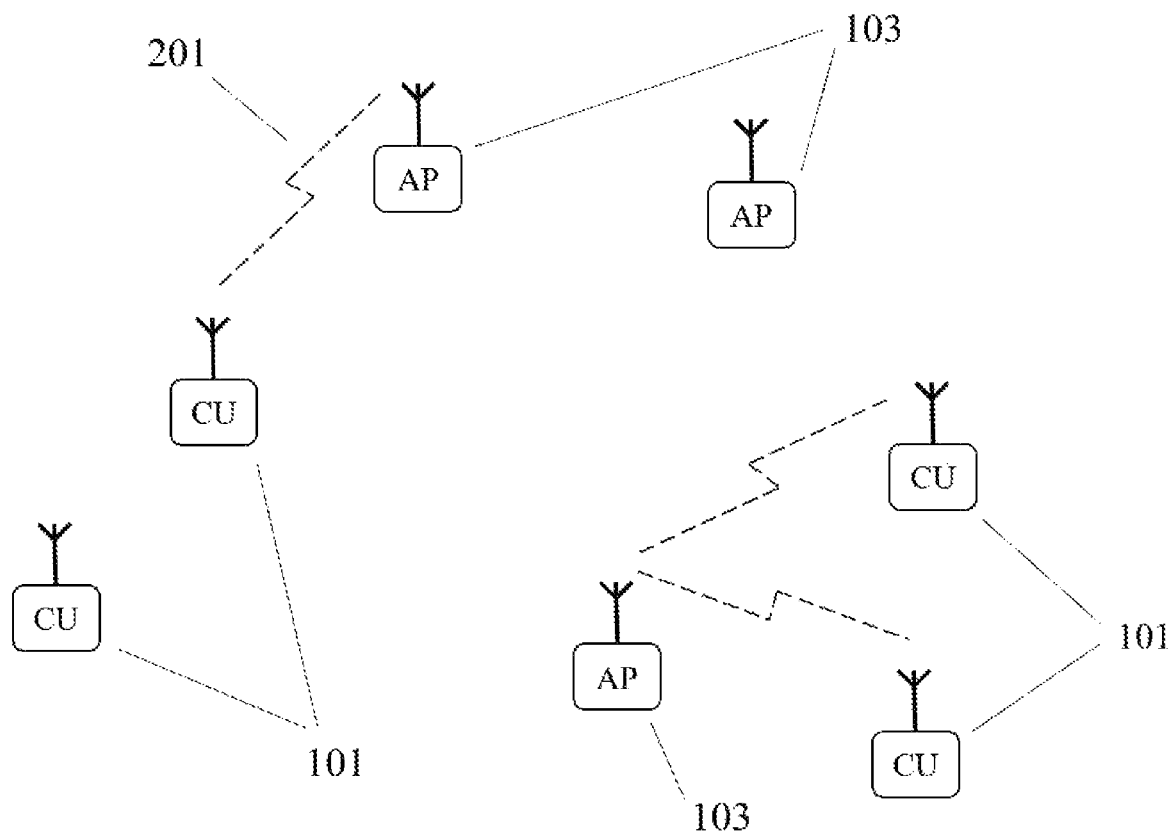
FIG. 2 illustrates an example of elements of a mm wave radio communication system in accordance with some embodiments of the invention.

Another example of a mm wave radio communication system is shown in FIG. 2, which comprises communication units 101 and Access Points 103 that in contrast to the example of FIG. 1 may be separate and not interconnected. Communication links 201 are formed between some of the APs 103 and some of the communication units 101. Specifically, in the example, the access points 103 have a communication link to zero, one or more communication units 101 and the communication units 101 have a link to zero or one AP 103. No restriction is imposed on the mobility of the APs or the communication units and indeed their location may be fixed or may undergo motion.

The radio conditions may change for the communication units 101, and the optimum access points 103 with which to connect may change as well. Further, a new AP 103 or communication unit 101 may appear in a pre-existing system. In order to support such scenarios, the system supports the establishment of new links between access points 103 and communication units 101 with the goal of providing a communication link to every access point 103 and communication unit 101.

In the system of FIG. 2, communication units 101 are arranged to access and communicate with access points 103 but typically do not communicate directly with each other. Rather, communication between different communication units 101 may be achieved via one or more access points 103.

In the mm wave radio communication systems, access points are arranged to control air interface resource allocation for the communication units that are connected to/attached to/associated with the access point communication unit. Specifically, the access point is in many embodiments arranged to allocate communication time intervals of communication channels to the communication unit connected to the access point, including allocating time intervals to any direct communications between two non-access point communication units attached to the access point communication unit.

In many embodiments, the mm wave radio communication system may use a plurality of frequency channels and each access point communication unit is allocated a subset, and typically only one, of these frequency channels. Each frequency channel may have a large bandwidth, such as e.g. a bandwidth of hundreds of MHz or exceeding one GHz. A typical example is having an access point frequency channel bandwidth of 2 GHz. In many cases, an access point communication unit is arranged to divide such a frequency channel into a plurality of time slots that may be allocated to communication between a specific communication unit and the access point, or between two communication units communicating directly with each other. The allocation and communication of time slots to individual communications is performed via the access point.

A set of communication units served and controlled by a single access point may be referred to as a BSS as previously mentioned. The communication units 101 of a BSS may communicate via the access point or may in some cases communicate directly with each other under the control of the access point and using the resource/frequency channel allocated to the access point. Typically, a BSS operates on a single frequency channel.

An access point is in some systems referred to as PCP/AP (Personal BSS Control Point/Access Point, the primary device in a BSS) and a communication unit may be referred to as an STA (STAtion).

The communication system may specifically be based on the WiGig radio standards known as IEEE 802.11ad and 802.11ay. In the system, the radio deployment comprises at least one AP node and at least one STA node, and typically multiple APs and STAs. Communication is achieved by associating i.e. forming radio links between AP's and STA's. A radio link may be formed between an AP and a STA, and in some embodiments only between an AP and a STA. Radio links may exist between an AP and multiple STA's. A STA may form a radio link with one AP.

A radio link is in the system established using an allocated communication/frequency channel. The terms communication channel and frequency channel may be used interchangeably, and one may be replaced by the other (as appropriate). A frequency channel/communication channel may correspond to a frequency band, and thus may be defined by a frequency and a bandwidth. A frequency channel/communication channel may also be referred to/described by the term frequency band or frequency band channel.

As previously mentioned, each AP is allocated at least one frequency/communication channel which is a frequency band channel determined by a given frequency and bandwidth. This channel will also be referred to as a full communication channel.

In the specific system, the AP is allocated such a communication channel with no restriction of time i.e. the channel is a frequency band allocated to the AP for continuous use. The frequency band/communication channel that is allocated to the APs typically differs between APs in order to reduce interference. However, there is typically only a relatively small number of frequency band channels available resulting in the same full communication channels/frequency bands being allocated to multiple APs and BSSs, i.e. communication channels may be reused. This may result in co-channel interference between the APs and BSSs.

In some typical systems, no more than ten, six or even four frequency band channels with e.g. a 2 GHz bandwidth are employed. The communication channel/frequency band channel allocated to an AP may be given by a communication channel bandwidth and a communication channel frequency (which may also be referred to as a(n AP resource) frequency band channel and a(n AP resource) frequency band frequency). The communication channel frequency is typically given as the mid-frequency of the frequency band allocated to the AP.

The AP is typically arranged to allocate air interface resource of the allocated communication channel to communication units associated with the AP. In particular, it may use a Time Division Multiple Access, TDMA, approach where the communication channel is divided into time slots that may be individually allocated to the communication units.

However, rather than merely allocate the entire frequency band/communication channel to communication units for a given time slot, the APs of the described system may divide the frequency band/communication channel into smaller frequency bands/communication channels. Such, communication sub-channels/sub-frequency bands may typically have smaller bandwidths than the full bandwidth of the frequency band/communication channel. However, in many embodiments, the AP may also allocate the entire full communication channel for a given time slot, and thus the full communication channel may itself be a communication sub-channel which can be allocated to a communication unit.

Indeed, each subchannel may be given by a bandwidth that is selected from a set of bandwidths where each of the bandwidths does not exceed the communication channel bandwidth, i.e. the bandwidth of the communication sub-channels is equal to or smaller than the frequency band/communication channel allocated to the AP.

In the following example, the communication channel bandwidth (also referred to as the Full Bandwidth, FB) will be a multiple of the sub-channel bandwidths B (and indeed for the multiple of one FB=B). Specifically, the sub-channel bandwidth B may be equal to the full bandwidth FB, half bandwidth HB=FB/2, or quarter bandwidth QB=FB/4. It will be appreciated that in other embodiments, the set of possible bandwidths may include other possible sub-bandwidths.

Each communication sub-channel is further given by a frequency which is given by the full communication channel frequency, fc, and a frequency offset. The frequency offset may accordingly reflect where in the full communication channel, the communication sub-channel is positioned. For example, for a frequency offset of zero, the communication sub-channel frequency is equal to the full communication channel frequency and the communication sub-channel may be positioned in the center of the full communication channel.

The frequency offset is in the specific approach formed by two frequency offsets, namely a first and a second frequency offset. The first frequency offset is a relatively large frequency offset whereas the second frequency offset is a relatively small frequency offset (except for (substantially) zero frequency offsets).

In particular, the first frequency offset is selected from a first set of frequency offsets. In some scenarios, the first frequency offset may only include a single frequency offset, which specifically may be a zero frequency offset. However, in most scenarios, the first set of frequency offsets may include a plurality of first frequency offsets.

The smallest absolute difference between first frequency offsets (when the set comprises more than one frequency offset) is no less than one fourth of the communication sub-channel bandwidth. Thus, changing the first frequency offset from one value to another will result in the communication sub-channel being moved by at least a quarter of the communication sub-channel bandwidth within the frequency band of the full communication channel. Indeed, in some embodiments, the difference between neighbor first frequency offsets is substantially equal to the communication sub-channel bandwidth B, (e.g. $\Delta f1=B\pm1\%$). In this case, selecting different first frequency offsets f1 from the set will move the communication sub-channel in the frequency band such that it will not be overlapping, i.e. the communication sub-channels for different first frequency offsets will not be overlapping for the difference between frequency offset equal to or exceeding the bandwidth of the communication sub-channel (plus any potential value of the second frequency offset).

The first frequency offset may thus be considered to be a large frequency offset that is used to position different communication sub-channels in different sub-frequency bands within the full frequency band of the full communication channel. The first frequency offset is also referred to as the large frequency offset.

The first set of frequency offsets is limited such that the frequency offsets do not have a magnitude exceeding half of the communication channel bandwidth, FB/2. First frequency offsets may be limited such that any communication sub-channel will have a frequency offset that ensures that the communication sub-channel is fully within the bandwidth of the full communication channel.

The set of possible first frequency offsets typically advantageously includes a frequency offset that has a magnitude which does not exceed one hundredth of the communication sub-channel bandwidth. Specifically, the first frequency offsets typically advantageously include a zero frequency offset.

The second set of frequency offsets include relatively small frequency offsets and specifically the maximum magnitude of the second set of frequency offsets does not exceed a tenth, or in some cases does not exceed 5%, 3%, 1%, of the communication sub-channel bandwidth. The second offset frequencies are also small relative to the data symbol rate and indeed maximum frequency offset of the second set of frequency offsets does not in many embodiments exceed a 5%, 10%, 20%, or 30% of the data symbol rate.

The second set of frequency offsets may however in many embodiments include at least one frequency offset no less than 0.01%, 0.05%, 0.1%, 0.5%, or 1% of the communication sub-channel bandwidth and/or the data symbol rate.

Thus, the second frequency offset is a small frequency offset which only moves the frequency bands by a relatively small amount. In particular, it only moves the communication sub-channel by a small amount compared to the bandwidth of the communication sub-channel. As a result, communication sub-channels that have the same first frequency offset but different second frequency offsets overlap by a substantial amount, and indeed can in many cases be considered to essentially occupy the same frequency band but with a small frequency offset between them.

The set of possible second frequency offsets typically advantageously includes a frequency offset that has a magnitude which does not exceed one hundredth of the communication sub-channel bandwidth. Specifically, the second frequency offsets typically advantageously include a zero frequency offset. The second frequency offset is also referred to as the small frequency offset.

In many embodiments, the first set of frequency offsets may include frequency offsets such that the communication sub-channels for different first frequency offsets and for the same second frequency offset results in substantially non-overlapping communication sub-channel. In many embodiments, the overlap may be no more than 1%, 2%, 5%, or 10%.

The second set of frequency offsets is such that for the same first frequency offset, the communication sub-channels for different second frequency offsets have frequency bands that are overlapping (typically by no less than 10%, 25%, 50%, 75%, or 90%.

The system accordingly utilizes channelization including subdivision of the full communication channels. As a specific example, the following sub-channels may be used where FB stands for Full (communication channel) Bandwidth, HB stands for Half Bandwidth and QB stands for Quarter Bandwidth. The number of full communication channels used in the system is n and each of them is given by the FB bandwidth and the full communication channel (center) frequency fc. The first frequency offset is indicated by $f_l$ and the second frequency offset by $f_s$.

The following (sub)channels may for example be used in the system:

$nB = FBf_c \in \{f_{c1}, f_{c2}, \ldots, f_{cn}\} f_l = 0 f_s = 0 FB$(pure), channelizations:

n n n

-continued $6nB = FBf_c \in \{f_{c1}, f_{c2}, \ldots, f_{cn}\} f_i =$ $0 f_s \in \{f_{F1}, f_{F2}, f_{F3}, f_{F4}, f_{F5}, f_{F6}\} FB(\text{small offset})$, channelizations:

$6n$ $6n$ $6n$ $6n$ $nB = HBf_c \in \{f_{c1}, f_{c2}, \ldots, f_{cn}\} f_i = 0 f_s = 0 HB(\text{pure})$, channelizations:

$n$ $n$ $n$ $n$ $2nB = HBf_c \in \{f_{c1}, f_{c2}, \ldots, f_{cn}\} f_i \in \{f_{HL}, f_{HR}\} f_s = 0 HB(\text{large offset})$, channelizations:

$2n$ $2n$ $2n$ $2n$ $6nB = HBf_c \in \{f_{c1}, f_{c2}, \ldots, f_{cn}\} f_i =$ $0 f_s \in \{f_{H1}, f_{H2}, f_{H3}, f_{H4}, f_{H5}, f_{H6}\} HB(\text{small offset})$, channelizations:

$6n$ $6n$ $6n$ $6n$ $12nB =$ $HBf_c \in \{f_{c1}, f_{c2}, \ldots, f_{cn}\} f_i \in \{f_{HL}, f_{HR}\} f_s \in \{f_{H1}, f_{H2}, f_{H3}, f_{H4}, f_{H5}, f_{H6}\}$ $HB(\text{large offset, small offset})$, channelizations:

$12n$ $12n$ $12n$ $12n$ $nB = QBf_c \in \{f_{c1}, f_{c2}, \ldots, f_{cn}\} f_i = 0 f_s = 0 QB(\text{pure})$, channelizations:

$n$ $n$ $n$ $n$ $nB = QBf_c \in \{f_{c1}, f_{c2}, \ldots, f_{cn}\} f_i \in \{f_{QL1}, f_{QL0}, f_{QR0}, f_{QR1}\} f_s =$ $0 QB(\text{large offset})$, 4 channelizations:

$n$ $n$ $n$ $n$ $nB = QBf_c \in \{f_{c1}, f_{c2}, \ldots, f_{cn}\} f_i =$ $0 f_s \in \{f_{Q1}, f_{Q2}, f_{Q3}, f_{Q4}, f_{Q5}, f_{Q6}\} QB(\text{small offset})$, 6 channelizations:

$n$ $n$ $n$ $n$ $4nB = QBf_c \in \{f_{c1}, f_{c2}, \ldots, f_{cn}\} f_i \in \{f_{QL1}, f_{QL0}, f_{QR0}, f_{QR1}\} f_s \in$ $\{f_{Q1}, f_{Q2}, f_{Q3}, f_{Q4}, f_{Q5}, f_{Q6}\} QB(\text{large offset, small offset})$, 2 channelizations:

$4n$ $4n$ $4n$ $4n$

In some embodiments the small offsets can be related as $f_{Fi} = 2f_{Hi} = 4f_{Qi}$ [Hz].

The set of channelizations in this example can be summarized as follows:

$7nB = FBf_c \in \{f_{c1}, f_{c2}, \ldots, f_{cn}\} f_i =$ $0 f_s \in \{0, f_{F1}, f_{F2}, f_{F3}, f_{F4}, f_{F5}, f_{F6}\} FB$, channelizations:

$7n$ $7n$ $7n$ $7n$ $21nB = HBf_c \in \{f_{c1}, f_{c2}, \ldots, f_{cn}\} f_i \in$ $\{0, f_{HL}, f_{HR}\} f_s \in \{0, f_{H1}, f_{H2}, f_{H3}, f_{H4}, f_{H5}, f_{H6}\}$ $HB(\text{large offset, small offset})$, channelizations:

$21n$ $21n$ $21n$ $21n$ $nB = QBf_c \in \{f_{c1}, f_{c2}, \ldots, f_{cn}\} f_i \in \{0, f_{QL1}, f_{QL0}, f_{QR0}, f_{QR1}\} f_s \in$ $\{0, f_{Q1}, f_{Q2}, f_{Q3}, f_{Q4}, f_{Q5}, f_{Q6}\} QB(\text{large offset, small offset})$, 35 channelizations:

$n$ $n$ $n$ $n$

Figure 3:
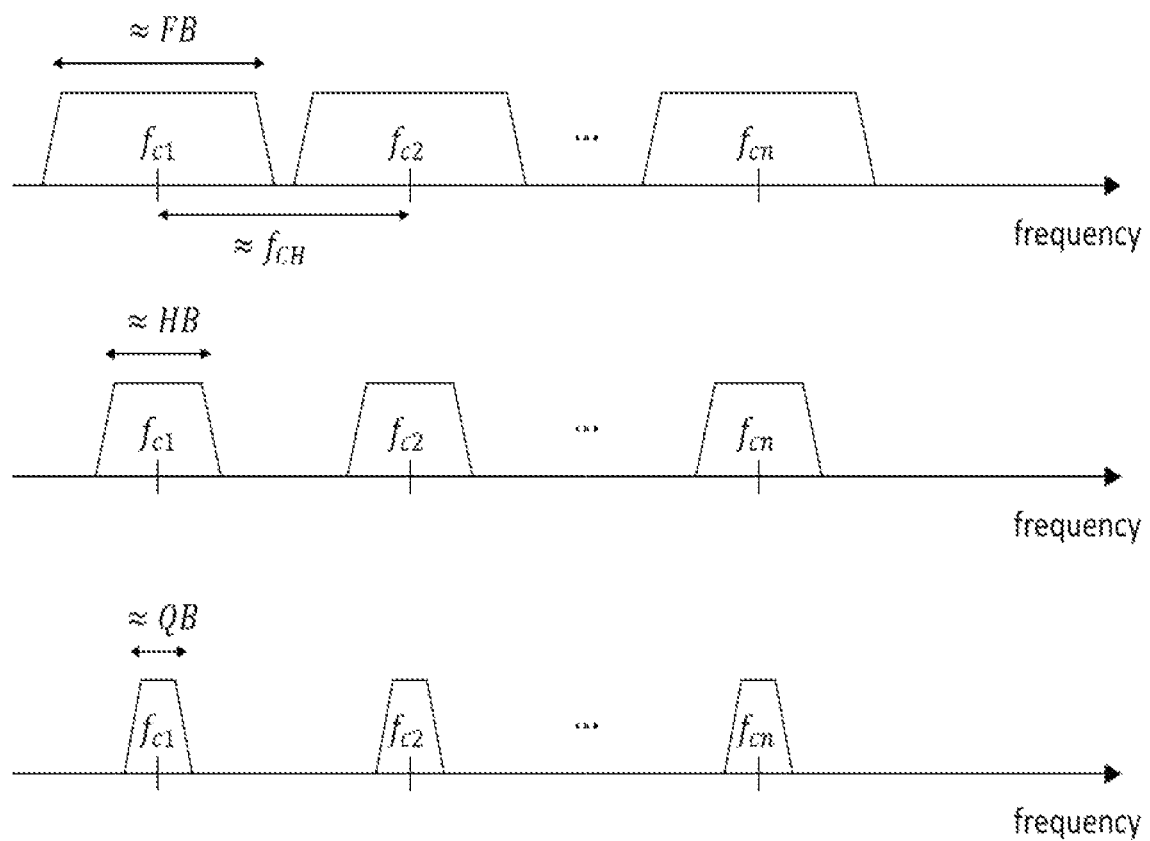
FIG. 3 illustrates an example of frequency bands for communication sub-channels in a mm wave radio communication system in accordance with some embodiments of the invention.

FIGS. 2 and 3 illustrate examples of different frequency bands for different channelizations based on the different parameters described above. Intuitively, it may be thought appropriate to only combine the fractional bandwidth variants HB and QB with large frequency offsets such that only non-overlapping communication channel bandwidths are possible. However, by allowing overlapping communication channel bandwidths more channels are available thereby providing more flexibility and the potential of a higher capacity. It may for example be of significant benefit when a dense deployment that needs to be expanded, or for a deployment involving at least one moving node, where two geographically remote nodes are allocated the same range of frequencies then move closer.

A particular significance of the approach is that small frequency offsets (the second frequency offsets) may be combined effectively with large frequency offsets that are used together with reduced bandwidth channelization. In particular, the small frequency offsets may also be applied to communication sub-channels with reduced bandwidths (i.e. to HB and QB channels). Further, this may be combined effectively with using the large frequency offsets to position the reduced bandwidth communication sub-channels in the frequency band of the full communication channel.

Whereas the large frequency offsets may effectively be used to provide substantially orthogonal and non-overlapping communication sub-channels such that interference between different APs and BSSs using different communication sub-channels can effectively be reduced or even removed, the small frequency offset results in overlapping communication sub-channels, and indeed in substantially overlapping communication sub-channels. Thus, the small frequency offset does not provide direct interference mitigation by separating the signals of different communication sub-channels. However, as described in EP3729899B1, small frequency offsets may still provide improved results in the presence of interference between different APs and BSSs.

In particular, a particular problem caused by interference is that it may allow the detection of specific data patterns, such as preambles, to be less reliable. This may for example lead to start of packet (SoP) detection errors in a receiver. A severe SoP interference mode can be caused by an interfering signal being treated as a start of packet on an expected or wanted transmission. Such treatment causes the communication unit to enter a packet detection and decoding process which only allows the transceiver to return to reception mode upon completion of the decode process. In the case when an erroneous packet is misinterpreted as the correct data packet, then delay and packet loss occurs due to the time taken to decode and discard the erroneous packet. For example, if a start of packet data pattern from another AP is detected by a communication unit, the communication unit proceeds to decode the identified data packet and cannot be arranged to receive the correct data packet from the correct transmitter until the decoding of the identified erroneous data packet has been completed. As such, severe start-of-packet interference results in significant delays and data packet loss during normal operation.

Such interference may be thought of as "structured noise", in that the received signal appears to be acceptable, but has been received from an incorrect transmitter, and so is not, in fact, relevant to the receiver concerned, and should be treated as noise. However, due to the structured nature of the received signal, the receiver can mistake the erroneous signal for a valid start-of-packet signal. Thus, a particular issue arises with erroneous detections of the start of data packets from an undesired transmitter which may be detected as originating from the desired transmitter. Thus, the interference suppression may be sufficient to allow communication but insufficient to prevent false detections of new packets.

More specifically, data packets may include a detection data sequence, such as e.g. a preamble. The detection data sequence may be a predetermined data sequence, e.g. selected from a set of predetermined data sequences defined for the communications network. A receiver may use knowledge of such a detection data sequence to determine that a data packet has been received. For example, the receiver may continuously demodulate the received signal and compare it to a local replica of the predetermined data sequence(s), e.g. by correlating demodulated data with stored versions of the predetermined data sequence(s). If a correlation exceeds a given threshold, the receiver may assume that a valid data packet has been received and it may accordingly initiate the process of receiving the data packet.

However, there is a risk that a transceiver may receive a data packet intended for another transceiver. As such a data packet will also comprise a detection data sequence, this may be detected by the transceiver which will assume that it is receiving a valid data packet and it will initialize reception. Eventually, the transceiver will be able to detect that the data packet is not one intended for the transceiver but as the initialization process tends to be complex, this will typically tend to be a relatively slow process. Accordingly, interference in the form of a transceiver receiving and detecting a data packet not intended for the transceiver can result in the transceiver being engaged for a long time interval during which it is not able to receive any data packets addressed to it.

The risk of such interference causing an erroneous detection may be mitigated, reduced or removed by applying a small frequency offset so that channels are still overlapping but have a small frequency offset with respect to each other. The frequency offset or shift may not substantially affect the level of interference between different transceivers, but by introducing a small frequency offset, it has been found that it is possible to very substantially reduce the risk of false start of packet detections (or other given/specific data patterns) from interfering transceivers.

Indeed, by using different offset amounts, so that different pairs of transceivers encode at different respective baseband centre, the severe start-of-packet interference can be greatly reduced, since the receiving transceiver will not be able to correlate the incoming interference signal.

Specifically, the start of a data packet may be based on detecting the presence of a detection data sequence. For a data packet transmitted from the expected transceiver, the communication sub-channel frequency is known and compensated for in the receiver, and accordingly the detection algorithm, and specifically the correlation of the received data with the local replicas of the detection data sequences, will proceed as for a system not employing any frequency offset. Thus, the detection of a valid data packet from the desired source transceiver will not be impacted and the same detection performance can be achieved.

However, if an interfering data packet is received from another transceiver, this will have a different small frequency offset. Accordingly, the operation of the receiver will result in a baseband signal that has an offset relative to 0 Hz even after compensation in the receiver. As a consequence, the detection data sequence of the received data packet will be frequency translated/shifted by a value equal to the difference in the baseband centre frequency of the desired transceiver and the baseband centre frequency of the interfering transceiver.

This frequency offset will effectively result in a different detection data sequence being decoded than the one that was sent. Sampling a received baseband signal at a data rate will for a suitable frequency offset modify the detected data. Accordingly, the frequency offset effectively transforms the received detection data sequence into a different sequence. As this no longer corresponds to the transmitted detection data sequence, and is unlikely to coincidentally match one of the stored detection data sequences, the risk of detecting the interfering signal as a valid detection data sequence may be greatly reduced. Accordingly, the probability of detecting a signal from an interfering transceiver as a valid signal may be substantially reduced.

In the system, the APs are arranged to transmit a beacon signal in one of the communication sub-channels. The beacon signal is broadcast independently of whether any communication units are attached to the AP or not. It provides a signal that can be detected by communication units/STAs and thus the communication units can determine which APs are available in the present location and for the current conditions. In particular, if communication unit detects a beacon signal, it can decode this to determine appropriate data for the specific AP and then apply appropriate parameters to associate with the specific AP.

To aid association, an AP accordingly transmits a beacon signal using a certain channelization. A communication unit/STA may then perform the process known as scanning i.e. it may attempt to detect or discover the presence of a beacon signal in a communication channel. Upon successfully detecting a beacon, further steps may be taken to achieve association.

In many systems, the communication units do not have any information of which communication sub-channel is used to transmit the beacon signal and when trying to detect the presence of an AP that can serve the communication unit, it must accordingly proceed to search for a beacon signal in all possible communication sub-channels. In other words, it is up to the communication unit to discover the channelization used by the AP.

At one extreme, it would be possible to configure every communication unit and every AP with exactly one channelization. This may work in simple networks where it is known a priori how links between communication units and AP's should be formed. The scan for a beacon would in such a case result in a straightforward search process. However, if a change to AP's channelization is required, e.g. due to an evolution of network layout or a need to avoid interference, this involves a matching change to communication units channelization search configuration i.e. significant continuing configuration overhead.

At the other extreme, no guidance is given to the communication units as to what set of channelizations to scan or in what order. The communication units must search a large search space (sized 63n in line with the previous examples). The AP channelization may in many systems be changed at will, yet it must be guaranteed that the beacon is discoverable by the STA's. Such an approach may accordingly provide very substantial benefits. However, a substantial issue is that the scan process may become very long as a large number of communication sub-channels must be scanned. For complexity and cost, typical communication units include only a single radio transceiver function and accordingly only one communication sub-channel can be monitored at a time. Accordingly, a sequential scanning is performed which may take some time. Further, during this time no active communication can be supported and therefore there may be a substantial delay in associating to new APs, and thus in initializing new radio links or handing over from one AP to another.

Figure 4:
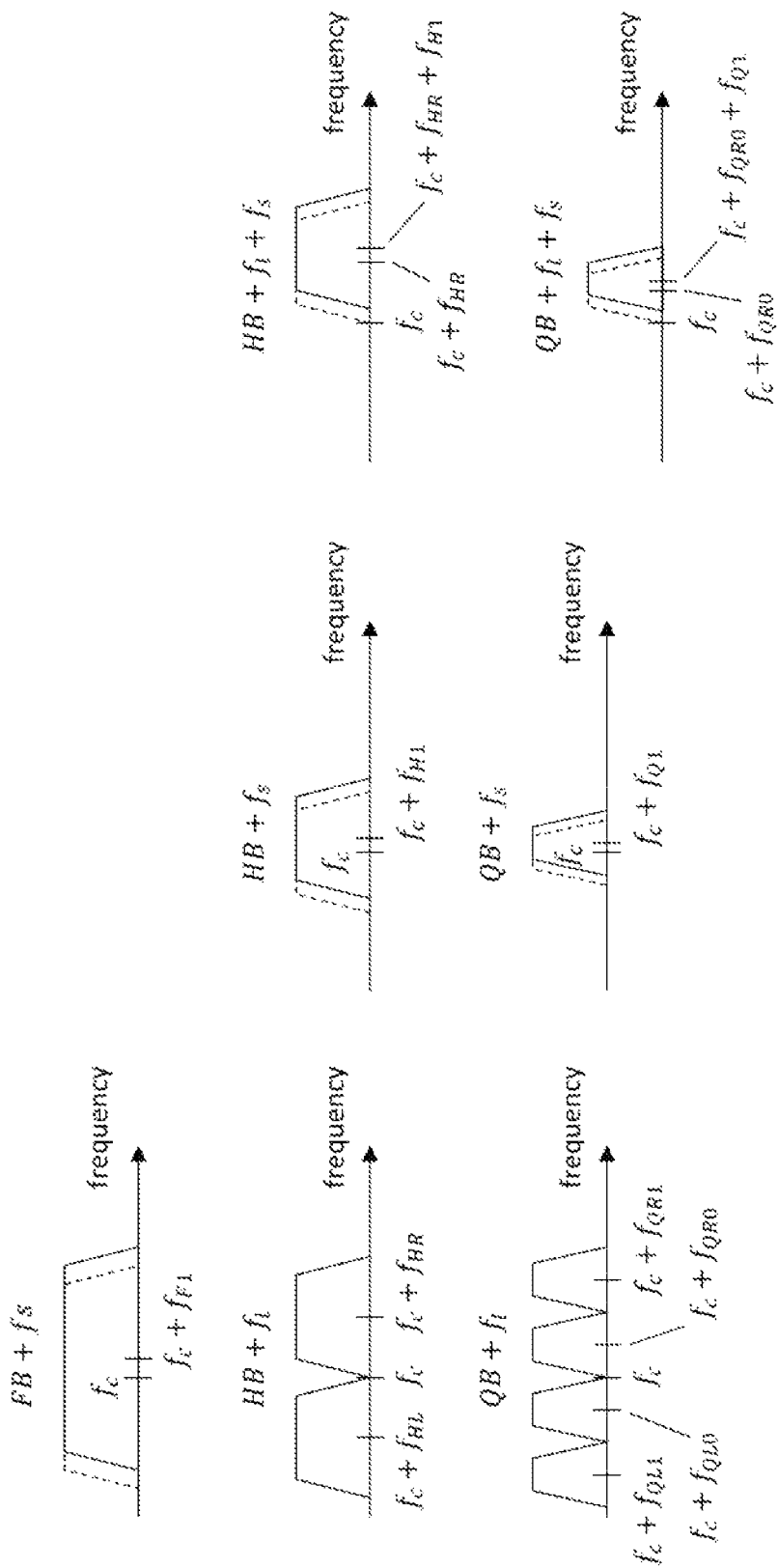
FIG. 4 illustrates an example of frequency bands for communication sub-channels in a mm wave radio communication system in accordance with some embodiments of the invention.

FIG. 4 illustrates an example of a communication unit 101 that may provide an efficient operation and which in particular in many scenarios may provide an improved, and in particular typically, a faster detection of AP beacons.

The communication unit 101 comprises a (radio) communication circuit 501 which is arranged to communicate with access points over mm wave radio communication links formed in communication sub-channels. The communication circuit 501 specifically comprises a radio transceiver that can transmit and receive mm wave radio transmissions in accordance with the technical specifications for the system. The communication circuit 501 may further comprise various control and support functions for operating, maintaining, and controlling the mm wave communications with an access point. It will be appreciated that the functions performed by the communication circuit 501 may be implemented in any suitable way and that the person skilled in the art will be aware of many suitable implementations.

The communication circuit 501 is coupled to a scanner 503 which is arranged to scan the communication sub-channels for a beacon transmitted by a wireless access point. As will be described in more detail later, the scanner 503 is arranged to perform a sequential scan of the communication sub-channels and for each communication sub-channel check whether a beacon signal from an access point is received/detected. If a beacon is detected in a communication sub-channel, the scanner 503 may terminate the scan. The scanner 503 is specifically arranged to control the communication circuit to receive on a given communication sub-channel and it then evaluates whether a beacon is received in this given communication sub-channel. The scanner 503 is arranged to proceed to step through the possible communication sub-channels until a beacon is detected by a detection criterion being met.

The scanner 503 is coupled to a controller 505 which is arranged to control the communication circuit 501 to initiate/set up a mm wave radio communication link with an AP from which a beacon is detected to be received. Specifically, the scanner 503 may in response to detecting beacon in a given communication sub-channel provide the controller 505 with information that a beacon has been detected and in which communication sub-channel it has been detected. It may further provide additional information extracted from the beacon, such as an AP identity, address, modulation format, etc.

In response to the detection, the controller 505 may then proceed to access the AP using the determined parameters, and in particular by transmitting a communication setup request/association request to the AP. The transmission may specifically be performed in the communication sub-channel in which the beacon was received (e.g. in a time slot reserved for communication/association request messages). Thus, in response to detecting a beacon, the controller 505 may proceed to control the communication circuit 501 to transmit a message that initiates a setup of a communication link/association.

The communication units 101 accordingly include functionality which is arranged to detect new APs by detecting beacon transmissions. The beacons are detected by a scan process which specifically may be across all possible communication sub-channels. The approach may thus allow new APs in the current locality of the communication units 101 to be detected and for the communication units 101 to associate and establish communication with such APs. The approach may be used for setup of a new communication service or may be used for handover/reconnection. For example, if an active mm wave radio communication link drops (e.g. due to worsened propagation conditions or the communication units 101 moving), the communication units 101 may proceed to initialize a new scan to find a new AP to continue supporting an ongoing communication service.

The scanner 503 is arranged to perform a sequential search. However, as the number of different communication sub-channels may be quite high, such a sequential search may possibly take a long time. Indeed, typically the communication units 101/communication circuit 501 comprise only a single receiver such that only one communication sub-channel can be evaluated at a time (and only when the communication units 101 is not communicating).

The scan is performed in accordance with a scanning order, and thus the communication sub-channels are scanned in a given scanning order. Each communication sub-channel is given by a set of parameters, namely the communication sub-channel bandwidth and the communication sub-channel frequency which is given as the combination (specifically summation) of the full communication channel frequency, the first frequency offset (the large frequency offset), and the second frequency offset (the small frequency offset). The scan order of the communication channels can accordingly be considered to be determined by how these parameters are modified.

In the described approach, the scanner 503 is arranged to apply a specific scan order which in many cases will proceed to provide improved detection of beacons, and which typically in many scenarios will be arranged to detect beacons faster thereby allowing a reduced delay in detecting new APs and in establishing communication therewith.

In particular, in the approach, the scanner 503 is arranged to apply a scan order which includes a sequence of a plurality of subchannels that have the same second frequency offset but with different first frequency offsets and/or different communication channel frequency frequencies, i.e. it includes at least one sequence which has the same small frequency offset while varying at least one of the large frequency offset and the communication channel frequency.

It has been realized that such an approach and specific scanning order may provide particularly advantageous performance in many scenarios. It may in particular allow beacons of suitable APs to be detected faster and/or for more suitable APs to be detected. Indeed, rather than simply stepping through the possible communication sub-channel in the order of increasing frequency of the communication sub-channel, the approach specifically jumps between communication sub-channels such that communication sub-channels further apart, and often non-overlapping, are scanned before closer together channels are scanned. It has been found that this may increase the probability that a beacon is detected earlier with reduced interference. By jumping between channels further apart in the frequency spectrum, diversity and interference/noise variation may be increased.

In many embodiments, the scan order may be implemented to include a set of nested loops in which one of the parameters is kept constant while another parameter is sequentially changed over the members of the set of possible values. The scanner 503 may accordingly in many embodiments be arranged to perform the scan operation by implementing a set of nested loops. Thus, a parameter of an outer loop is set to a given value and then a parameter of an inner loop (or parameters of multiple e.g. nested inner loops of the outer loop) is sequentially changed between the possible values for that parameter (or those parameters).

In particular, in such cases, the scan order may include a first loop varying the second frequency offset over the set of possible values for the second frequency offset and a second loop varying the first frequency offset over the set of possible values for the first frequency offset. Further, the scan order is specifically arranged such that the second loop is an inner loop of the first loop, thus the scan order may be implemented using at least two loops varying respectively the large frequency offset and the small frequency offset, and where the loop varying the large frequency offset is an inner loop of the loop varying the small frequency offset.

Such an approach may be particularly advantageous due to realizing that the scanning may be triggered in response to a communication unit losing or experiencing a poor radio connection with an AP due to the emergence of adverse co-channel interference. In this case, a change of the first (large) frequency may advantageously result in 'jumping' to a sub-channel which is substantially free of co-channel interference as opposed to 'moving' to a subchannel ridden with such interference as a result of changing the small frequency offset.

Thus, specifically, the scanner 503 may be arranged to set a value of the small frequency offset and then proceed to sequentially set the large frequency offset to the different offsets included in the set of possible large frequency offsets. For each of these values, the scanner 503 may seek to detect a beacon in the corresponding communication sub-channel. If a beacon is detected, the scan may be terminated and the communication unit 101 may proceed to associate with the detected AP. If not, it proceeds to the next large frequency offset until all large frequency offsets have been selected at which point it selects the next small frequency offset and executes the inner loop for that value.

Such an approach may provide a particularly efficient approach that may provide an efficient scanning and is likely to result in a faster detection of a suitable AP if present.

In many embodiments, the set of nested loops may also include a third loop that varies the communication sub-channel bandwidth, and specifically third loop may be arranged to step through all the communication sub-channel bandwidths of the set of possible communication sub-channel bandwidths. In some embodiments, the third loop may be an outer loop of the first loop, i.e. the scanner 503 may be arranged to vary the small frequency offset (and the large frequency offset) while keeping the communication sub-channel bandwidth B constant.

Such an approach may be particularly advantageous in many scenarios. For example, for many receiver implementations, the cost associated with reconfiguring different channelization parameters may differ in a parameter dependent way. For example, a change of the sub-channel bandwidth may involve a reconfiguration of the analogue processing subsystem, including a change to an analogue filter bandwidth. Also, since a change of sub-channel bandwidth typically leads to a corresponding change to signal structure in the time domain, there is typically a need to reconfigure time-related parameters of the receiver such as the start and duration of a signal power measurement window or the settling time of analogue impairments relative to the updated signal structure in time. As a result, a change of sub-channel bandwidth may involve increased complexity, compared to a change of either the small or large frequency offset and, as a consequence, it is advantageous to avoid performing sub-channel bandwidth change frequently.

In many embodiments, the scanner 503 is further arranged to include a loop which varies the full communication channel frequency over the values of the set of possible full communication channel frequencies. Such loop may in many embodiments be an inner loop of the first loop, i.e. the full communication channel frequency loop may be an inner loop of the loop varying the small frequency offset. In such a case, the scanner 503 may accordingly vary the full communication channel frequency over all possible values while keeping the small frequency offset constant.

Such an approach may be particularly advantageous as may be realized by considering that the scanning may in many cases be triggered in response to a communication unit losing or experiencing a poor radio connection with an AP due to the emergence of adverse co-channel interference. In this case, a change of the full communication channel frequency may advantageously result in 'jumping' to a sub-channel which is substantially free of co-channel interference as opposed to 'jumping' to a subchannel ridden with such interference as a result of changing the small frequency offset.

In many embodiments, the loop varying the full communication channel frequencies may advantageously be an inner loop of the second loop, i.e. the full communication channel frequency loop may be also an inner loop of the loop varying the large frequency offset. In such a case, the scanner 503 may accordingly vary the full communication channel frequency over all possible values while keeping the large frequency offset constant.

Such an approach may be particularly advantageous e.g. in a deployment where the APs are known to form a number of clusters. A cluster includes a plurality of APs placed at the same location and adapted to use the same full communication channel frequency and different large frequency offsets selected from a known set of offsets, the APs of the same cluster characterized by substantially the same radio coverage in terms of range and angular spread. Different AP clusters use different full communication channel frequencies. In this scenario, the fact that a communication unit is unable to detect the beacon at a given full communication channel frequency and a large frequency offset, selected from the known set of offsets, indicates that the communication unit is unlikely to detect a beacon by scanning for other large frequency offsets at the same full communication channel frequency. In this case, it is advantageous for the communication unit to vary the full communication channel frequency while keeping the large frequency offset constant.

As another example, in some receiver implementations, varying the full communication channel frequency will be implemented as part of analogue processing and varying the large frequency offset will be implemented as part of digital processing. In some receiver architectures, reconfiguring the digital processing subsystem will be less efficient (in terms of time, energy, etc.) compared to reconfiguring the analogue processing subsystem. In this case, it will be advantageous to sweep the full communication channel frequency while keeping the constant large frequency offset.

However, in other embodiments, the loop varying the full communication channel frequencies may advantageously be an outer loop of the second loop, i.e. the full communication channel frequency loop may be an outer loop of the loop varying the large frequency offset. In such a case, the scanner 503 may accordingly vary the large frequency offset over all possible values while keeping the constant full communication channel frequency.

Such an approach may be particularly advantageous in e.g. a deployment where information is available to a communication unit that it is likely to be able to associate to an AP on each full communication channel frequency. In this case, it is expedient of the communication unit to sweep the large frequency offset over all possible values while keeping the constant full communication channel frequency.

As another example, in some receiver implementations, varying the full communication channel frequency will be implemented as part of analogue processing and varying the large frequency offset will be implemented as part of digital processing. In some receiver architectures, reconfiguring the digital processing subsystem will be more efficient (in terms of time, energy, etc.) compared to reconfiguring the analogue processing subsystem. In this case, it will be advantageous to sweep the large frequency offset while keeping the constant full communication channel frequency.

In the approach, the scanner 503 is arranged to terminate the scan if a beacon is detected in one of the communication sub-channels. It will be appreciated that different approaches and criteria for detecting whether a beacon is received or not will be known to the skilled person and that any suitable approach can be used without detracting from the invention.

In many cases, the scanner 503 may be arranged to detect that a beacon is received in the communication sub-channel based on evaluating a detection criterion that includes a requirement that a beacon signal is received which meets a signal quality criterion.

For example, the scanner 503 may seek to receive and decode data of any signal received in the communication sub-channel. If data can be decoded with sufficiently high quality, such as e.g. with an error rate below a given level, and with the decoded data comprising beacon data (i.e. data included in the beacon transmissions from an AP), then it will be considered that a beacon is received.

As another example, the beacon transmissions may include preamble transmissions and the scanner 503 may correlate the received signal with expected preambles for beacon signals. In this case, if a correlation above a given threshold is detected, it may be considered that a beacon signal has been received.

In some cases, the detection criterion may include detecting whether a received signal quality metric exceeds a threshold. Such signal quality metric may include the received signal power, a Signal to Noise Ratio, a Channel Quality Indicator, etc.

In some embodiments, the scanner 503 may be arranged to terminate the scan operation in response to a detection that a signal is received from a wireless access point with which the wireless communication unit has previously established a mm wave radio communication link. Thus, if the scanner 503 detects that a beacon signal is received from an AP with which the communication unit 101 has previously been associated, it may stop the scan and proceed to re-establish this association.

As an example, the AP may be adapted to change its channelization, for example in response to the emergence of strong co-channel interference, causing the link between the AP and a communication unit to be lost. It may be advantageous for the communication unit, upon detecting the AP during the ensuing scan, to re-associate with that AP.

As another example, a radio link between an AP and a communication unit may be lost due to the appearance of a moving obstacle. It may be advantageous for the communication unit, upon detecting the AP during a future scan, to re-associate with that AP.

The scan process may thus specifically involve varying four parameters: B, $f_c$, $f_l$, $f_s$. At the outset, it might seem that the order in which these are varied during the scan is inconsequential and specifically that it is appropriate to scan such that communication sub-channel close together are scanned in order, i.e. scanning is performed across the frequency spectrum from a lower frequency to an upper frequency (or vice versa). Further, it would be more intuitive to arrange the scan into a set of nested loops, where varying the small frequency offset, $f_s$, forms the inner most loop. This is because it is common practice to arrange such loops so that the coarser grained parameters are traversed as part of outer loops while fine grained parameters, such as $f_s$, are traversed as part of the inner loop. However, it has been found that substantial advantages can be achieved by controlling the scan to follow a specific scan order. Indeed, it has been found that, for a given bandwidth, B, it is advantageous to scan the (substantially) non-overlapping combinations of $f_c$, $f_l$ first, while keeping the small frequency offset, $f_s$, fixed.

This may be e.g. be appreciated from the following considerations:

Suppose that a communication unit/station STA1 has associated with access point AP1, using the channelization defined by $B_1$, $f_{c,1}$, $f_{l,1}$, $f_{s,1}$.

After a period of time, AP1's channelization may be modified, for example in response to adverse co-channel interference. Assuming that the bandwidth is to be unchanged, three parameters remain available to change: $f_{c,1}$, $f_{l,1}$, $f_{s,1}$.

Given the appearance of co-channel interference, replacing the small frequency offset $f_{s,1}$ with an alternative will not fundamentally improve the link between AP1 and STA1.

On the other hand, changing any of the parameters $f_{c,1}$, $f_{l,1}$ amounts to 'jumping' to a different non-overlapping channel location. While this may result in jumping into co-channel interference, it is also probable to result in absence of co-channel interference. Consequently, it is advantageous to change (at least) one of $f_c$, $f_l$ at AP1, before modifying $f_s$.

Accordingly, it is advantageous for scanning attempts at STA1 first to sweep $f_c$, $f_l$ while keeping $f_s=f_{s,1}$ unmodified and only then move on to an $f_s$ sweep as part of an 'outer loop' operation.

In some embodiments, the scanner 503 may be arranged to apply a specific order when varying a parameter within a given loop. In particular, in many embodiments, the scanner 503 may advantageously initiate a given loop with a specific initial value.

In particular, in many embodiments, the scan order is arranged to include communication subchannels that have a small first (i.e. large) frequency offset before communication channels that do not have a small first frequency offset. In particular, at least one first frequency offset with a magnitude not exceeding one hundredth of the communication sub-channel bandwidth is scanned before a first frequency offset exceeding one hundredth, or in some cases one tenth, of the communication sub-channel bandwidth.

In particular, in many embodiments, the scan order is arranged to include communication subchannels that have a small second (i.e. small) frequency offset before communication channels that do not have a small second frequency offset. In particular, at least one second frequency offset with a magnitude not exceeding one hundredth of the communication sub-channel bandwidth is scanned before a second frequency offset exceeding one hundredth, or in some cases one tenth, of the communication sub-channel bandwidth.

Such approaches may reflect that very small frequency offsets may often be selected in preference to larger frequency offset (e.g. when only a few communication sub-channels are allocated or needed to support the communications in an area). In particular, often frequency offsets around zero, i.e. corresponding to substantially no frequency offset, are often used as a default or nominal or most frequently setting for the communication sub-channels in case only a subset of the possible communication sub-channels are used, such as e.g. in very sparse or isolated areas where interference is not a substantial problem. Accordingly, first scanning such communication sub-channels may often provide a faster detection of beacons and APs.

Thus, in many embodiments, the first value of the large frequency offset value may be a zero frequency offset, and thus the first communication sub-channel(s) that is(are) scanned when the scanner 503 initiates this loop is that for which there is no large frequency offset, i.e. typically corresponding to the center frequency of the full communication channel bandwidth.

In particular, in many embodiments, the scan order is arranged to include communication subchannels having a zero first (i.e. large) frequency offset before communication channels that do not have a zero first frequency offset. Thus, in many embodiments, the first value of the large frequency offset value may be a zero frequency offset, and thus the first communication sub-channel(s) that is(are) scanned when the scanner 503 initiates this loop is that for which there is no large frequency offset, i.e. typically corresponding to the center frequency of the full communication channel bandwidth.

In many embodiments, the scan order is arranged to include communication subchannels having a zero second, i.e. small, frequency offset before communication channels that do not have a zero second/small frequency offset. Thus, in many embodiments, the first value of the small frequency offset value may be a zero frequency offset, and thus the first communication sub-channel(s) that is(are) scanned when the scanner 503 initiates this loop is that for which there is no small frequency offset.

A zero frequency offset may specifically be a frequency offset having a magnitude of less than 1% of the communication sub-channel bandwidth.

In many embodiments, the scan order is arranged to include communication subchannels having a larger bandwidth before communication subchannels having a smaller bandwidth, i.e. larger communication sub-channels are scanned before smaller communication sub-channels.

Such specific orders may in many embodiments provide improved and a faster scan process. In particular, in many embodiments, some communication sub-channels tend to be used more than others, and in particular larger bandwidth channels are often likely to be used for beacon transmissions than smaller bandwidth channels. Similarly, in many practical communication systems, communication sub-channels with no frequency offset are more frequently used for beacon transmissions than other communication sub-channels. The scan order may accordingly be adapted to increase the probability of a beacon transmission being detected early. Also, stepping between larger bandwidth communication sub-channels is also likely to provide a faster variation in interference and noise as these may vary across the frequency spectrum.

In many transceiver implementations, varying the full communication channel frequency may be implemented as part of analogue processing, using frequency upconversion and downconversion techniques familiar to those skilled in the art.

In many transceiver implementations, varying the large or small frequency offset will be implemented as part of digital processing, substantially according to the following equation:

$$y[n]=x[n]e^{jn\phi}$$

where n is a sample index, x[n] denotes signal samples before applying the frequency offset, j is the imaginary unit such that $j^2=-1$, ϕ is a per sample phase increment which may be positive, zero or negative valued, and y[n] denotes signal samples after applying the frequency offset. It will be appreciated by those skilled in the art that the phase increment ϕ may be adapted to support the application of the large frequency offset, the application of the small frequency offset, or the application of both the large and small frequency offset.

It will be appreciated that the process of selecting or applying a frequency offset equal to 0, be it for the large or small frequency offset, is equivalent to not enabling or not applying a frequency offset.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Each node, wireless modem, and the configuration controller may may be implemented in any suitable way including e.g. using discrete or dedicated electronics. The configuration controller may for example be implemented as an integrated circuit such as an Application Specific Integrated Circuit (ASIC). In some embodiments, the circuits (including in particular the configuration controller) may be implemented as a programmed processing unit, such as for example as firmware or software running on a suitable processor, such as a central processing unit, digital signal processing unit, or microcontroller etc. It will be appreciated that in such embodiments, the processing unit may include on-board or external memory, clock driving circuitry, interface circuitry, user interface circuitry etc. Such circuitry may further be implemented as part of the processing unit, as integrated circuits, and/or as discrete electronic circuitry. In particular, a processing unit (or units) may be used having a processor (such as a CPU or DSP) coupled via a data bus and address bus to memory may provide a hardware platform for executing code stored in the memory. The memory may typically include RAM, ROM, as well as possibly other volatile and non-volatile memory elements. Program code implementing the described principles and approaches may be stored in non-volatile memory, such as ROM, and extracted and executed by the processor. Data used during execution may be temporarily stored on volatile memory, such as RAM.

The processor may further be coupled to a communication interface that allows the processor to interface to a suitable communication medium, such as a data bus or a data network. The communication medium may be used to exchange communication between the configuration controller and wireless modems of the node. A processor unit implementing the configuration controller may be coupled to a communication interface that can communicate with a communication interface of a wireless modem via a suitable communication medium. Similarly, A processor unit implementing a wireless modem may be coupled to a communication interface that can communicate with a communication interface of the configuration controller via a suitable communication medium.

The communication units may include suitable functionality for mm wave radio links and functions to be performed. The processing unit may specifically be coupled to a radio unit that includes a modulator and upconverter(s) for generating a suitably modulated mm wave signal. A bank of phase rotators may generate a plurality of signals having different relative phases. These signals are fed to a bank/array of antenna elements resulting in a combined beam pattern being formed by the antenna elements. Similarly, for the receiving functionality, the wireless modems include a bank of phase rotators that rotate the received signals from the antenna elements of the antenna array. The phase rotated outputs are combined to generate a combined received signal that due to the phase rotations correspond to a beamform of the antenna array. A demodulator is fed the combined received signal and performs demodulation to generate the received data which is fed to the processing unit for processing. The transmit and receive functions include IF and RF amplifiers throughout the receive and/or transmit paths.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. A claim indicated to be dependent on one claim may also be dependent on all other claims. Specifically, a claim being defined as being dependent on claim 1 may be dependent on all previous claims, and specifically a reference to "claim 1" may be replaced by a reference to "any previous claim". Furthermore, the order of features in the claims does not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example and shall not be construed as limiting the scope of the claims in any way.

We claim:

1. A wireless communication unit for a mm wave communication system comprising wireless access points arranged to communicate using mm wave radio communication links formed in communication sub-channels of a communication channel selected from a plurality of communication channels, each communication channel having a communication channel bandwidth and a communication channel frequency and each communication sub-channel having a:
   communication sub-channel communication bandwidth selected from a set of bandwidths not exceeding the communication channel bandwidth; and
   a communication sub-channel frequency being the combination of:
   a communication channel frequency of a communication channel,
   a first frequency offset selected from a first set of frequency offsets, the first set of frequency offsets having a magnitude not exceeding half of the communication channel bandwidth and a minimum difference between frequency offsets of any first set of frequency offsets that comprise a plurality of frequency offsets being no less than one fourth of the communication sub-channel bandwidth; and
   a second frequency offset selected from a second set of frequency offsets, a maximum magnitude of the second set of offset frequencies not exceeding a tenth of the communication sub-channel bandwidth;
the wireless communication unit comprising:
   a communication circuit arranged to communicate with wireless access points over mm wave radio communication links formed in communication sub-channels;
   a scan circuit arranged to scan communication sub-channels for a beacon transmitted by a wireless access point; and
   a controller arranged to initiate a mm wave radio communication link with a first wireless access point in a first communication sub-channel in response to the scan circuit detecting a beacon being received from the first wireless access point in the first communication sub-channel;
   wherein the scan circuit is arranged to scan the subchannels in a scan order and to terminate the scan in response to the detection of the beacon being received; and the scan order includes a sequence of a plurality of subchannels having a same second frequency offset and at least one of different first frequency offset and a different communication channel frequency.

2. The wireless communication unit of claim 1, wherein the scan order includes a set of nested loops comprising a first loop of varying the second frequency offset over the second set of frequency offsets and a second loop of varying the first frequency offset over the first set of frequency offsets, the second loop being an inner loop of the first loop.

3. The wireless communication unit of claim 2, wherein the set of nested loops comprises a third loop varying the sub-channel bandwidth over the set of sub-channel bandwidths, the first loop being an inner loop of the third loop.

4. The wireless communication unit of claim 2, wherein the set of nested loops comprises a further loop varying the communication channel frequency over communication channel frequencies of the plurality of communication channels; the further loop being an inner loop of the first loop.

5. The wireless communication unit of claim 2, wherein the set of nested loops comprises a further loop varying the communication channel frequency over communication channel frequencies of the plurality of communication channels; the further loop being an outer loop of the second loop.

6. The wireless communication unit of claim 2, wherein the set of nested loops comprises a further loop varying the communication channel frequency over communication channel frequencies of the plurality of communication channels; the further loop being an inner loop of the second loop.

7. The wireless communication unit of claim 1, wherein the scan circuit is arranged to detect that the beacon is received in response to a detection criterion comprising a requirement that a beacon signal is received that meets a signal quality criterion.

8. The wireless communication unit of claim 1, wherein the controller is arranged to terminate the scan in response to a detection that a signal is received from a wireless access point with which the wireless communication unit has previously established a mm wave radio communication link.

9. The wireless communication unit of claim 1, wherein the scan order is arranged to include communication sub-channels having a first frequency offset with a magnitude not exceeding one hundredth of the communication sub-channel bandwidth before communication channels having a first frequency offset with a magnitude exceeding one hundredth of the communication sub-channel bandwidth.

10. The wireless communication unit of claim 1, wherein the scan order is arranged to include communication sub-channels having a second frequency offset with a magnitude not exceeding one hundredth of the communication sub-channel bandwidth before communication channels having a second frequency offset with a magnitude exceeding one hundredth of the communication sub-channel bandwidth.

11. The wireless communication unit of claim 1, wherein the scan order is arranged to include communication sub-channels having a larger bandwidth before communication subchannels having a smaller bandwidth.

12. The wireless communication unit of claim 1, wherein the first set of frequency offsets include a frequency offset having a magnitude not exceeding one hundredth of the communication sub-channel bandwidth.

13. The wireless communication unit of claim 1, wherein the second set of frequency offsets include a frequency offset having a magnitude not exceeding one hundredth of the communication sub-channel bandwidth.

14. The wireless communication unit of claim 1, wherein the first set of frequency offsets for at least one communication subchannel includes only one frequency offset.

15. The wireless communication unit of claim 1, wherein a maximum frequency offset of the second set of frequency offsets does not exceed a fifth of a data symbol rate.

16. A mm wave communication system comprising wireless access points arranged to communicate using mm wave radio communication links formed in communication sub-channels of a communication channel selected from a plurality of communication channels, each communication channel having a communication channel bandwidth and a communication channel frequency and each communication sub-channel having a:

communication sub-channel communication bandwidth selected from a set of bandwidths not exceeding the communication channel bandwidth; and a communication sub-channel frequency being the combination of:

a communication channel frequency of a communication channel, a first frequency offset selected from a first set of frequency offsets, the first set of frequency offsets having a magnitude not exceeding half of the communication channel bandwidth and a minimum difference between frequency offsets of any first set of frequency offsets that comprise a plurality of frequency offsets being no less than one fourth of the communication sub-channel bandwidth; and a second frequency offset selected from a second set of frequency offsets, a maximum magnitude of the second set of offset frequencies not exceeding a tenth of the communication sub-channel bandwidth; and a wireless communication unit comprising a communication circuit arranged to communicate with wireless access points over mm wave radio communication links formed in communication sub-channels;

a scan circuit arranged to scan communication sub-channels for a beacon transmitted by a wireless access point; and a controller arranged to initiate a mm wave radio communication link with a first wireless access point in a first communication sub-channel in response to the scan circuit detecting a beacon being received from the first wireless access point in the first communication sub-channel;

wherein the scan circuit is arranged to scan the subchannels in a scan order and to terminate the scan in response to the detection of the beacon being received; and the scan order includes a sequence of a plurality of subchannels having a same second frequency offset and at least one of different first frequency offset and a different communication channel frequency.

17. A method of operation for a wireless communication unit for a mm wave communication system comprising wireless access points arranged to communicate using mm wave radio communication links formed in communication sub-channels of a communication channel selected from a plurality of communication channels, each communication channel having a communication channel bandwidth and a communication channel frequency and each communication sub-channel having a:

communication sub-channel communication bandwidth selected from a set of bandwidths not exceeding the communication channel bandwidth; and a communication sub-channel frequency being the combination of:

a communication channel frequency of a communication channel, a first frequency offset selected from a first set of frequency offsets, the first set of frequency offsets having a magnitude not exceeding half of the communication channel bandwidth and a minimum difference between frequency offsets of any first set of frequency offsets that comprise a plurality of frequency offsets being no less than one fourth of the communication sub-channel bandwidth; and a second frequency offset selected from a second set of frequency offsets, a maximum magnitude of the second set of offset frequencies not exceeding a tenth of the communication sub-channel bandwidth;

the wireless communication unit comprising a communication circuit arranged to communicate with wireless access points over mm wave radio communication links formed in communication sub-channels; and the method comprising:

scanning communication sub-channels for a beacon transmitted by a wireless access point, the scanning of the communication sub-channels being in a scan order;

terminating the scan in response to a detection of a beacon being received from a first wireless access point in a first communication sub-channel; and initiating a mm wave radio communication link with the first wireless access point in the first communication sub-channel in response to the scanning detecting the beacon received from the first wireless access point in the first communication sub-channel;

wherein the scan order includes a sequence of a plurality of subchannels having a same second frequency offset and at least one of different first frequency offset and a different communication channel frequency.

\* \* \* \* \*